US008326942B2

(12) United States Patent
Cagenius

(10) Patent No.: US 8,326,942 B2
(45) Date of Patent: Dec. 4, 2012

(54) IP UNICAST STREAMING SERVICE DELIVERY

(75) Inventor: Torbjörn Cagenius, Sollentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 422 days.

(21) Appl. No.: 12/440,084

(22) PCT Filed: Sep. 5, 2006

(86) PCT No.: PCT/EP2006/066011
§ 371 (c)(1),
(2), (4) Date: Mar. 13, 2009

(87) PCT Pub. No.: WO2008/028515
PCT Pub. Date: Mar. 13, 2008

(65) Prior Publication Data
US 2010/0005177 A1 Jan. 7, 2010

(51) Int. Cl.
*G06F 15/16* (2006.01)
(52) U.S. Cl. .................................. 709/217
(58) Field of Classification Search .......... 709/217
See application file for complete search history.

(56) References Cited

U.S. PATENT DOCUMENTS

| 7,602,723 B2 * | 10/2009 | Mandato et al. | 370/236 |
| 7,702,726 B1 * | 4/2010 | Grabelsky et al. | 709/204 |
| 7,724,691 B2 * | 5/2010 | Mela et al. | 370/261 |
| 2004/0003046 A1 * | 1/2004 | Grabelsky et al. | 709/206 |
| 2004/0028055 A1 * | 2/2004 | Madour et al. | 370/395.21 |
| 2004/0162094 A1 * | 8/2004 | Riikonen et al. | 455/502 |
| 2006/0031393 A1 * | 2/2006 | Cooney et al. | 709/217 |
| 2009/0313376 A1 * | 12/2009 | Cedervall et al. | 709/227 |

OTHER PUBLICATIONS

Cagenius T., et al, "An IMS gateway for Service Convergence in Connected Homes" 45th Congress of the Federation of Telecommunications Engineers of the European Community (FITCE) Aug. 30, 2006 pp. 1-16.
Steven Whitehead, et al., "An Evaluation of SIP for Use in Streaming Media Applications" IETF Standard-Working-Draft, IETF, Feb. 2006.

* cited by examiner

*Primary Examiner* — Alicia Baturay

(57) ABSTRACT

A method of ordering the delivery of a unicast media stream to a second client terminal coupled to an IP Multimedia Subsystem network is described. The method comprises first sending a unicast media order from a first client terminal to an application server of said IP Multimedia Subsystem network. A Session Initiation Protocol INVITE message is then sent from the application server to said second client in response to receipt of said order, the INVITE message containing a media Universal Resource Locator identifying a media source. The Universal Resource Locator is used to exchange Real Time Streaming Protocol signalling between the second client terminal and the application server to initiate and control delivery of the media.

23 Claims, 4 Drawing Sheets

IP UNICAST STREAMING SERVICE DELIVERY

TECHNICAL FIELD

The present invention relates to delivering an IP unicast streaming service and is applicable in particular, though not necessarily, to delivering IPTV services.

BACKGROUND

IP television or IPTV is the name given to a range of services which allow television to be delivered over an IP network. Due to the flexible nature of an IP network, IPTV will allow for a much more personalised service to users, e.g. video-on-demand, with information delivered to users over unicast IP streams. However, to order and control these user specific services, the user would normally be expected to use his or her remote control whilst sitting in front of a Set-Top-Box (STB)/TV. Currently the predominant way of controlling these unicast streams is to use the real time streaming protocol (RTSP). RTSP does not specify a transport protocol but may be used, for example, to establish and control real-time transport protocol (RTP) media streams. RTSP is in many ways similar to the HTTP protocol used to request and exchange information over the web, but is tailored for streaming media such as audio and video. RTSP allows a client to request particular media streams from a streaming server, and specifies commands such as PLAY and PAUSE. RTSP is well suited to the conventional set-top-box use case.

It is expected that users of mobile terminals such as mobile telephones will wish to avail themselves of IPTV services. Indeed, this is probably key to the business models of network operators currently installing high capacity cellular networks such as 3G networks. Within cellular networks, IPTV is a service which will likely be facilitated by the so-called IP Multimedia Subsystem (IMS). IMS is the technology defined by the Third Generation Partnership Project (3GPP) to provide IP Multimedia services over mobile communication networks (3GPP TS 22.228, TS 23.218, TS 23.228, TS 24.228, TS 24.229, TS 29.228, TS 29.229, TS 29.328 and TS 29.329 Releases 5 to 7), although the IMS architecture is such that its services can be accessed and controlled via other interfaces, for example the Internet. IMS makes use of the Session Initiation Protocol (SIP) to set up and control calls or sessions between client terminals, or client terminals and application servers. The Session Description Protocol (SDP), carried by SIP signalling, is used to describe and negotiate the media components of the session. Whilst SIP was created as a user-to-user protocol, IMS allows operators and service providers to control user access to services and to charge users accordingly.

It will be appreciated that IMS and RTSP have traditionally been considered as alternative approaches for the establishment and control of unicast streaming sessions. Whilst IMS provides a mechanism for controlling QoS and charging, as well as transcoder negotiation, RTSP supports trickplay and basic video-oriented commands.

A number of systems are currently on the market which allow a user to remotely control a STB over the Internet. These include LocationFreeTV™ from Sony Corporation and Slingbox™ from Sling Media. Both of these systems allow a user to instruct the delivery of media from the home STB to a remote terminal.

SUMMARY OF THE INVENTION

Current commercially available systems such as Location-FreeTV and Slingbox are designed to allow a user of a remote terminal, for example an Internet connected device such as a mobile telephone, PDA, or laptop, to order the delivery of media from the home STB to the remote terminal. They are not designed to allow the user to order the delivery of media to some terminal other than the one currently being used, be it in the home or elsewhere. Even if this were possible, it would necessarily involve the routing of media through the home STB which would result in quality of service and scaleability issues.

It is desirable, for example, to allow a user to make use of a mobile telephone to order the delivery of media to a terminal in the user's hotel room or other current location, but this functionality is not facilitated by state of the art systems.

According to a first aspect of the present invention there is provided an application server for use in an IP Multimedia Subsystem to control the delivery of unicast media to client terminals, the application server comprising:
  a receiver for receiving a request from a first client terminal to deliver unicast media to a second client terminal; and
  a processor and transmitter for sending a Session Initiation Protocol INVITE message to said second client terminal, the INVITE including a media Universal Resource Locator identifying a media source.

Preferably, the application server comprises means for negotiating the identity of said second client terminal with said first client terminal. This means may comprise a transmitter for sending to the first terminal a list of allowed second client terminals, said receiver receiving from the first client terminal a selection from this list.

According to one embodiment of the invention, the application server comprises means for terminating a secure control channel established with said second client terminal. Further means is provided for using said control channel to provide source and destination address information, for delivering said unicast media, to said second client terminal and to a unicast media source. Preferably, said further means uses the Real Time Streaming Protocol (RTSP). Said further means may be arranged to receive from said second client terminal an RTSP DESCRIBE message addressed to said media URL, and to deliver this message to the media source.

According to a second embodiment of the invention, said processor and transmitter may be arranged to include in said Session Initiation Protocol INVITE a Session Description Protocol (SDP) part containing for the media stream. In addition, the SDP part may contain the media properties, for example audio and video codec formats. The application server comprises means for receiving from the second client terminal destination addressing information for the media stream contained in a Session Description Protocol part of a 200 OK response.

Said media source may be any suitable media source, for example an nPVR, a video-on-demand server, etc.

According to a second aspect of the present invention there is provided a method of ordering the delivery of a unicast media stream to a second client terminal coupled to an IP Multimedia Subsystem network, the method comprising:
  sending a unicast media order from a first client terminal to an application server of said IP Multimedia Subsystem network;
  sending a Session Initiation Protocol INVITE message from said application server to said second client in response to receipt of said order, the INVITE message containing a media Universal Resource Locator identifying a media source; and
  using said Universal Resource Locator to exchange Real Time Streaming Protocol signalling between said second client terminal and the application server to initiate and control delivery of the media.

In a first embodiment, receipt of the INVITE at said second terminal triggers an RTSP negotiation between the second terminal and a media source, via the application server, to establish source and destination addressing information for the media stream to be delivered. This negotiation involves the sending of an RTSP DESCRIBE message from the second terminal to the application server at said Universal Resource Locator. The message is delivered by the application server to the media source, and the media source returns a 200 OK response to the second client terminal via the application server. The RTSP messages may be sent over a secure IP control channel established between the second client terminal and the application server.

The INVITE may contain a plurality of Universal Resource Locators, corresponding to different media properties. The separate DESCRIBE and 200 OK exchange may be conducted for each URL, with the second client terminal selecting the appropriate Universal Resource Locator based upon its own properties.

In an alternative embodiment, the application server may include in said INVITE a Session Description Protocol part identifying the source addressing information for the media to be delivered. The Session Description Part may also contain media properties, for example audio and video codec formats. The second client terminal then returns destination addressing information in a Session Description Protocol part in the 200 OK response. The Session Description Protocol part of the INVITE may include properties of one or more media streams.

The application server and the first client terminal may carry out an initial negotiation procedure to identify to the application server the second client terminal. This may involve the application server sending to the first client terminal a list of candidate second terminal, and the first client terminal returning a selection to the application server.

According to a third aspect of the present invention there is provided a user terminal arranged in use to communicate with an application server of an IP Multimedia Subsystem, the user terminal comprising:

a transmitter for sending a request for delivery of unicast media to said application server;

a receiver for receiving from said application server a list of remote terminals authorised to receive unicast media from the application server; and a processor and transmitter for receiving a user selection from said list and for sending the selection to the application server.

The user terminal preferably comprises an HTTP interface for communicating with the application server.

DETAILED DESCRIPTION

Figure 1:
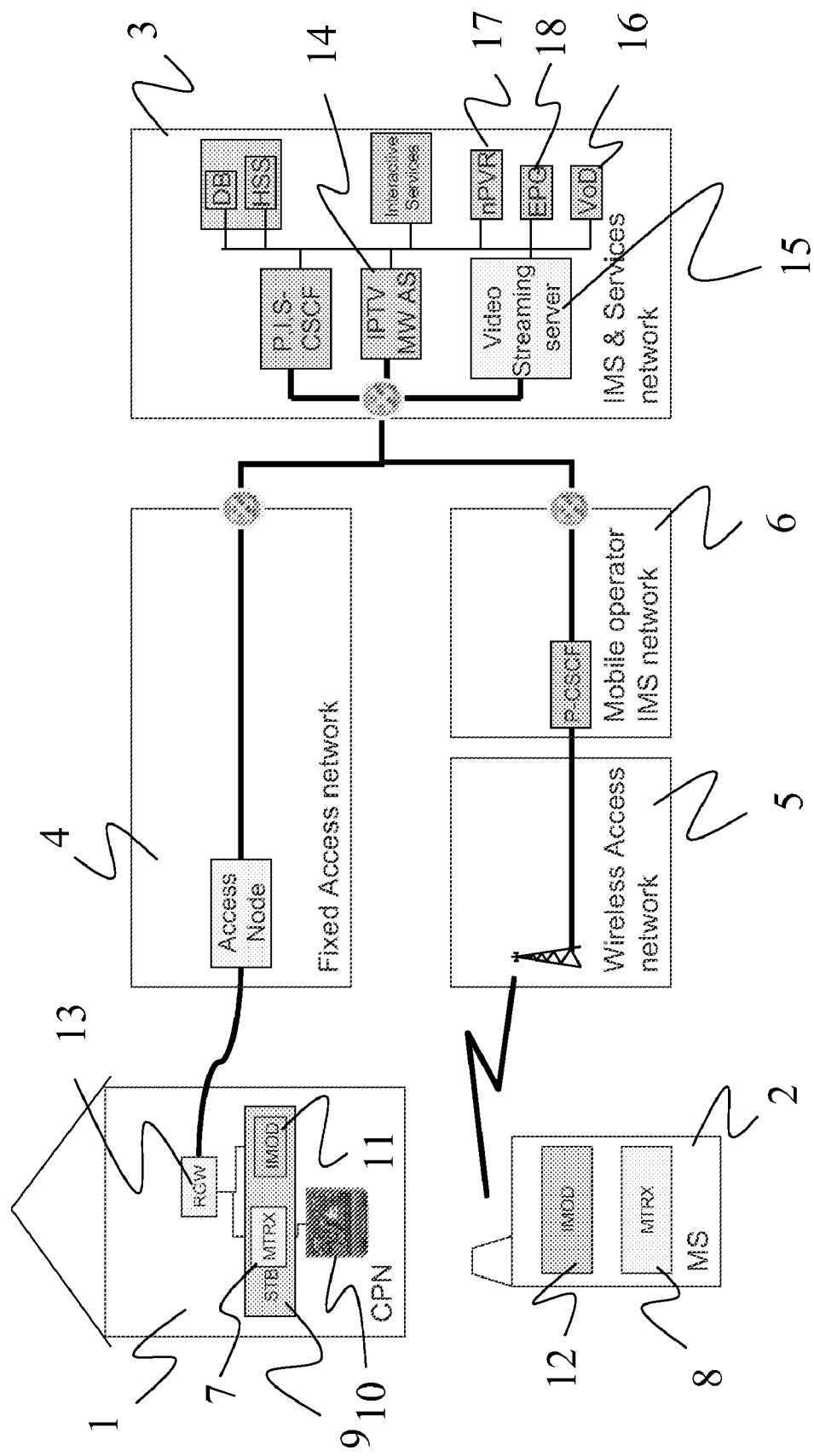
FIG. 1 illustrates schematically an IPTV topology architecture.

A brief description of the architecture and operation of the IP Multimedia Subsystem (IMS) will aid in understanding embodiments of the present invention.

Call/Session Control Functions (CSCFs) operate as SIP proxies within the IMS. The 3GPP architecture defines three types of CSCFs: the Proxy CSCF (P-CSCF) which is the first point of contact within the IMS for a SIP client (typically residing in a client terminal); the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF.

A user registers with the IMS using the specified SIP REGISTER method. This is a mechanism for attaching to the IMS and announcing to the IMS the (IP) address at which a SIP user identity can be reached. The user receives a unique Uniform Resource Identifier (URI) from the S-CSCF to be used when it initiates a dialog. In 3GPP, when a SIP client performs a registration, the IMS authenticates the user (using the AKA procedure), and allocates an S-CSCF to that user from the set of available S-CSCFs. Whilst the criteria for allocating an S-CSCF is not specified by 3GPP, these may include load sharing and service requirements. It is noted that the allocation of an S-CSCF is key to controlling (and charging for) user access to IMS-based services.

During the registration process, it is the responsibility of the I-CSCF to select an S-CSCF if one is not already selected. The I-CSCF receives the required S-CSCF capabilities from the home network's Home Subscriber Server (HSS), and selects an appropriate S-CSCF based on the received capabilities. (It is noted that S-CSCF allocation is also carried out for a user by the I-CSCF in the case where the user is called by another party, and the user is not currently allocated an S-CSCF.) When a registered user subsequently sends a session request (e.g. a SIP INVITE) to the IMS, the request will include the P-CSCF and S-CSCF URIs so that the P-CSCF is able to forward the request to the selected S-CSCF. This applies both on the originating and terminating sides (of the IMS). (For a terminating call the request will include the P-CSCF address and the User Equipment (UE) address.)

Within the IMS service network, Application Servers (ASs) are provided for implementing IMS service functionality. ASs provide services to end-users in an IMS system, and may be connected either as end-points over the 3GPP defined Mr interface, or "linked in" by an S-CSCF over the 3GPP defined ISC interface. In the latter case, Initial Filter Criteria (IFCs) are used by the S-CSCF to determine which ASs should be "linked in" during a SIP Session establishment. Different IFCs may be applied to different call cases. The IFCs are received by the S-CSCF from an HSS during the IMS registration procedure as part of a user's User Profile (UP). Certain ASs will perform actions dependent upon subscriber identities (either the called or calling subscriber, whichever is "owned" by the network controlling the AS). For example, in the case of call forwarding, the appropriate (terminating) application server will determine the new terminating party to which a call to a given subscriber will be forwarded.

As well as having SIP interfaces (ISC or Mr), an AS can have one or more non-SIP interfaces. In particular, the Ut interface allows an AS to communicate directly with a client terminal using, for example, the RTSP or HTTP protocols.

FIG. 1 presents an overview of the IPTV/IMS architecture illustrating the apparatus/functionality provisioned within a customer premises network (CPN) 1 (e.g. a home or a hotel room) and by a Mobile Station (MS) 2, which are attached respectively to the IMS 3 via a fixed access network 4 and a wireless access network 5/Mobile operator IMS network 6. Network elements of interest here are:

MTRX—Media Transmission/Reception Part 7,8; The "traditional" Set Top Box functionalities in an IMS enabled Set Top Box 9, for example reception of MPEG2 and/or MPEG4 streams and conversion of such streams for delivery to a TV 10.

IMOD—Identity and IMS Module 11,12; The part of an IMS enabled Set Top Box that contains the basic IMS service logic and the ISIM, as well as an application client. The IMOD could also be implemented in other devices in the home, e.g. the Residential Gateway (RGW) 13. The IMOD could also be implemented in a mobile phone, enabling remote access to TV services.

IPTV MW AS—IPTV Middleware SIP Application Server 14; The function that interacts between the IMS enabled STB and MS (and other IMS user devices) and the IPTV video servers. The IPTV MW AS also receives and processes HTTP and RTSP messages.

Video Streaming Server—the video streaming server 15. This is the source of unicast (streaming) media.

VoD—Video-on-demand (control) server 16. This server controls access to and playout from the distributed video unicast servers.

nPVR—network-based Personal Video Recorder 17. This server allows subscribers to store media, e.g. programmes, within the network. Playback is controlled via the IPTV MW AS.

EPG—Electronic Programme Guide 18. The EPG server stores details of currently available and upcoming media. A subscriber typically downloads the EPG via the IPTV MW AS and uses this to select or programme media delivery (available at the VoD/video unicast servers.

MTRX and the IMOD entities will be present within STBs that are used to access the IPTV service via the IMS. In addition, and as illustrated in the FIG. 1, these entities are present within a Mobile Station (MS) or client terminal, which could for example be a cellular telephone. It will be appreciated that the MS may be present within an IMS network of an operator that is not the operator of the IPTV service.

Figure 2:
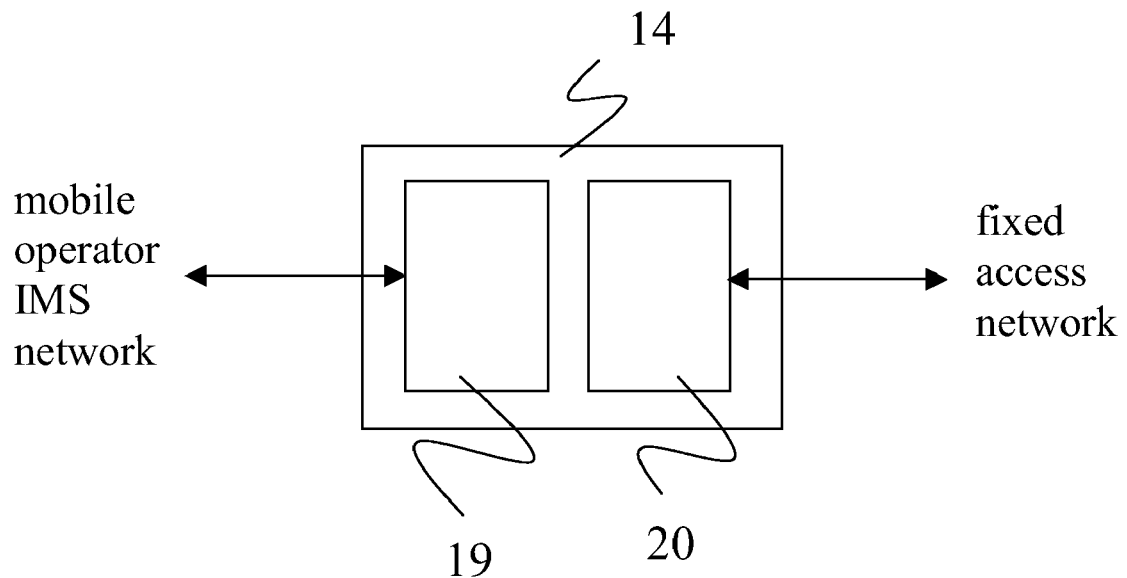
FIG. 2 illustrates schematically an IPTV MW AS of the network illustrated in FIG. 1.
Figure 3:
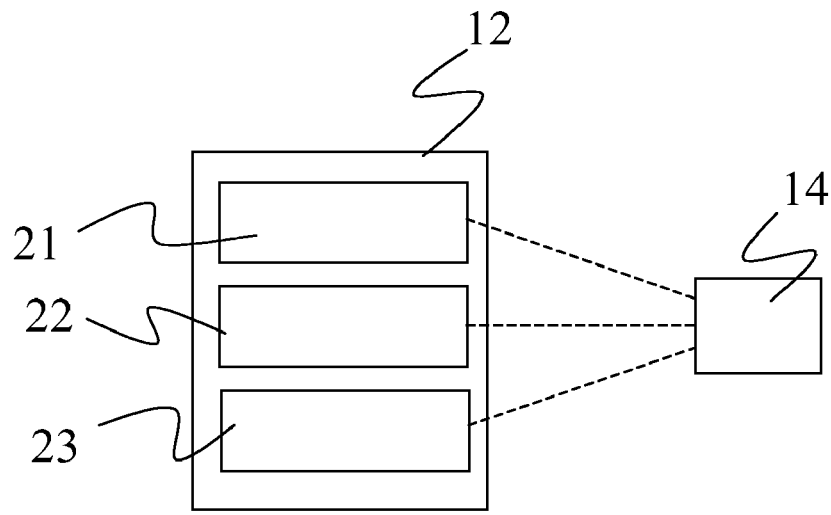
FIG. 3 illustrates schematically a mobile station of the network of FIG. 1.

FIG. 2 illustrates schematically the functional elements within the IPTV MW AS 14. These include a receiver 19 coupled to the Mobile Operator IMS network 6 and a processor/transmitter 20 coupled to the fixed access network. FIG. 3 illustrates schematically the functional elements within the IMOD 12 of the MS 2, namely a transmitter 21 for sending requests to the IPTV MW AS, a receiver 22 for receiving authorised MTRX lists from the IPTV MW AS, and a processor/transmitter 23 for accepting a user selection from the MTRX list and sending this to the IPTV MW AS.

A process for allowing a user of the MS to order the delivery of media to some third party terminal, located with the CPN 1, will now be described. As already described, an IMOD entity, IMOD1, is present in the MS. A second IMOD entity, IMOD2, is present within the STB in the CPN.

It is assumed that the user has registered with his own IMS network and has established a secure IP control channel with the IPTV MW AS, e.g. using Transport Layer Security (TLS). It is also assumed that the CPN STB is registered with the same or a different IMS network and has established its own secure control channel therewith. Furthermore, it is assumed that Network Address Translation (NAT) and firewall traversal is not required.

Figure 4:
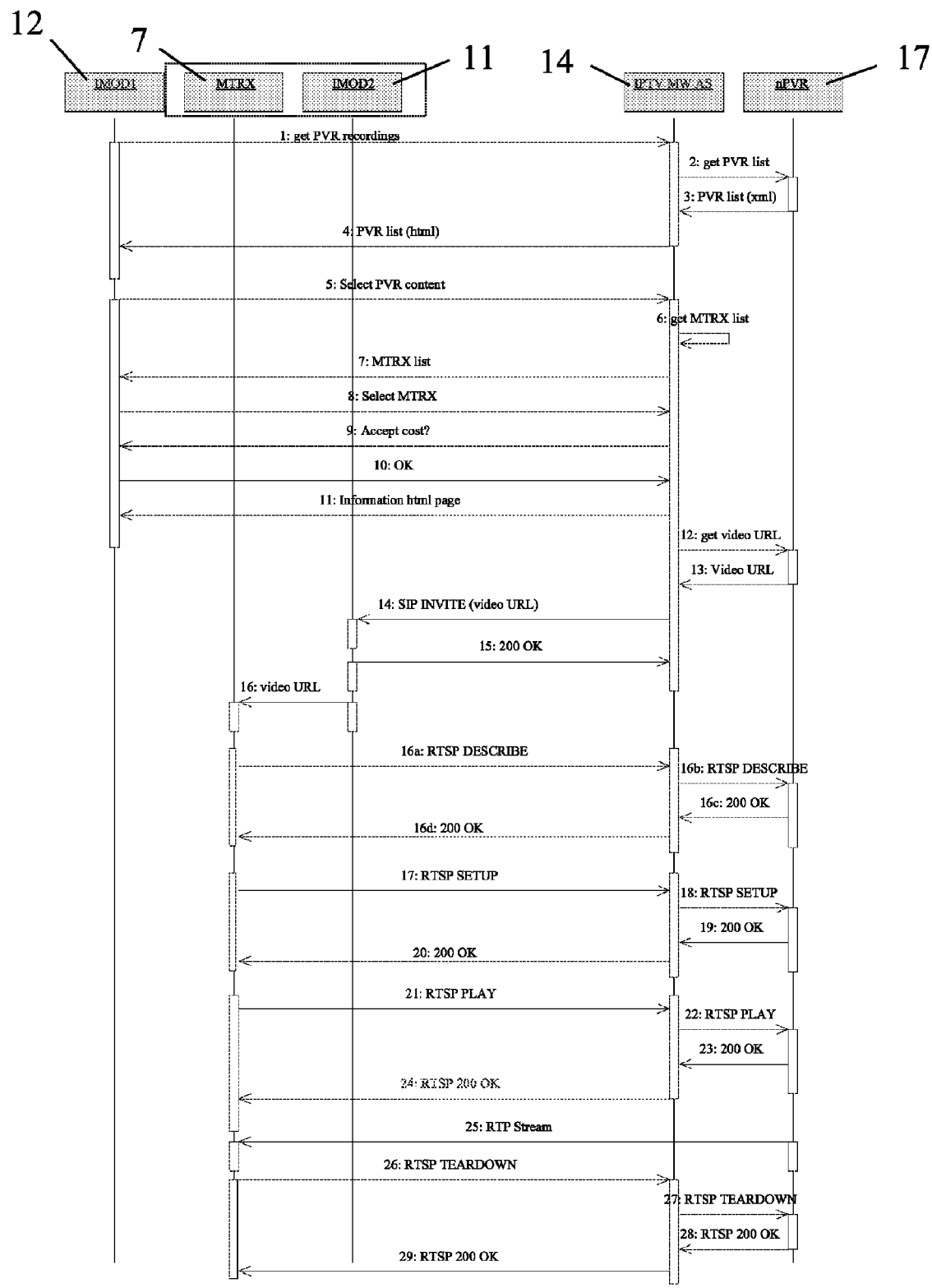
FIG. 4 illustrates a process for remotely ordering delivery of a unicast media stream according to a first embodiment of the invention.

FIG. 4 illustrates a process flow according to a first embodiment of the invention. At step 1, using the already established secure control channel and an HTTP interface, the application client within the IMOD1 at the MS sends a request to the IPTV MW AS to obtain a PVR recording list. This list is obtained by the IPTV MW AS from the nPVR server, and is returned to the MS at step 4. At step 5 the MS user selects the PVR content required and delivers this selection to the IPTV MW AS.

The IPTV MW AS maintains or has access to a user controlled list of approved MTRX entities that can receive media from a particular IPTV subscription. The user can add entries to or delete entries from this list using the established control channel, or possible offline, e.g. using a web interface. The list is delivered to the MS at step 7. The user then selects a MTRX entity, in this case the MTRX corresponding to the STB in the CPN, and delivers this to the IPTV MW AS at step 8 and 9. Steps 9 and 10 relate to notifying the MS of the cost associated with the service, if any, and acceptance of the cost by the MS user. At step 11, an information (web) page is delivered to the MS confirming the details of the user's order. This ends the involvement of the MS.

At steps 12 and 13, the IPTV MW AS obtains the video URL of the required media from the nPVR. The IPTV MW AS knows the identity of the MTRX to which the media is to be delivered, and sends a SIP INVITE containing the video URL to the MTRX at step 14. The INVITE is directed to the IMOD2. IMOD2 responds at step 15 with the standard 200 OK response. At step 16, the IMOD2 delivers the video URL to the MTRX of the STB, e.g. using the UPnP AV transport protocol where the MTRX and IMOD2 are physically separate. Assuming that the IMOD already knows the IP address of the IPTV MW AS it will also pass this address to the MTRX at step 16.

At steps 16a and 16b, the MTRX sends an RTSP DESCRIBE to the nPVR server (via the IPTV MW AS since the control channel ends at the IPTV MW AS) to retrieve media properties of the video URL link received in the previous step. The nPVR returns a 200 OK via the IPTV MW AS at steps 16c and 16d. The 200 OK contains the requested media properties, for example audio and video compression formats (e.g. MPEG2).

A standard RTSP SETUP procedure is initiated in order to exchange media IP address and port information between the client and the server. At step 17 the MTRX sends the RTSP SETUP command to the IPTV MW AS, including in the command its IP address and the RTP and RTCP ports where it expects to receive media. At step 18, the IPTV MW AS forwards the request to the nPVR based on the video URL in the RTSP SETUP message. At steps 19 and 20 the MTRX receives confirmation of its media port information and also the IP address and port numbers at the nPVR where the media will originate.

Steps 21 to 29 describe standard RTSP control signalling for the playout and termination of the requested media.

At step 14 of FIG. 4 it is possible to include in the SIP INVITE a plurality of video URLs each corresponding to a different set of video coding properties for the same content. The MTRX must then send multiple RTSP DESCRIBE messages (step 16a) to discover which URL has the best match. The MTRX will select the most appropriate URL before sending the RTSP SETUP at step 17.

Figure 5:
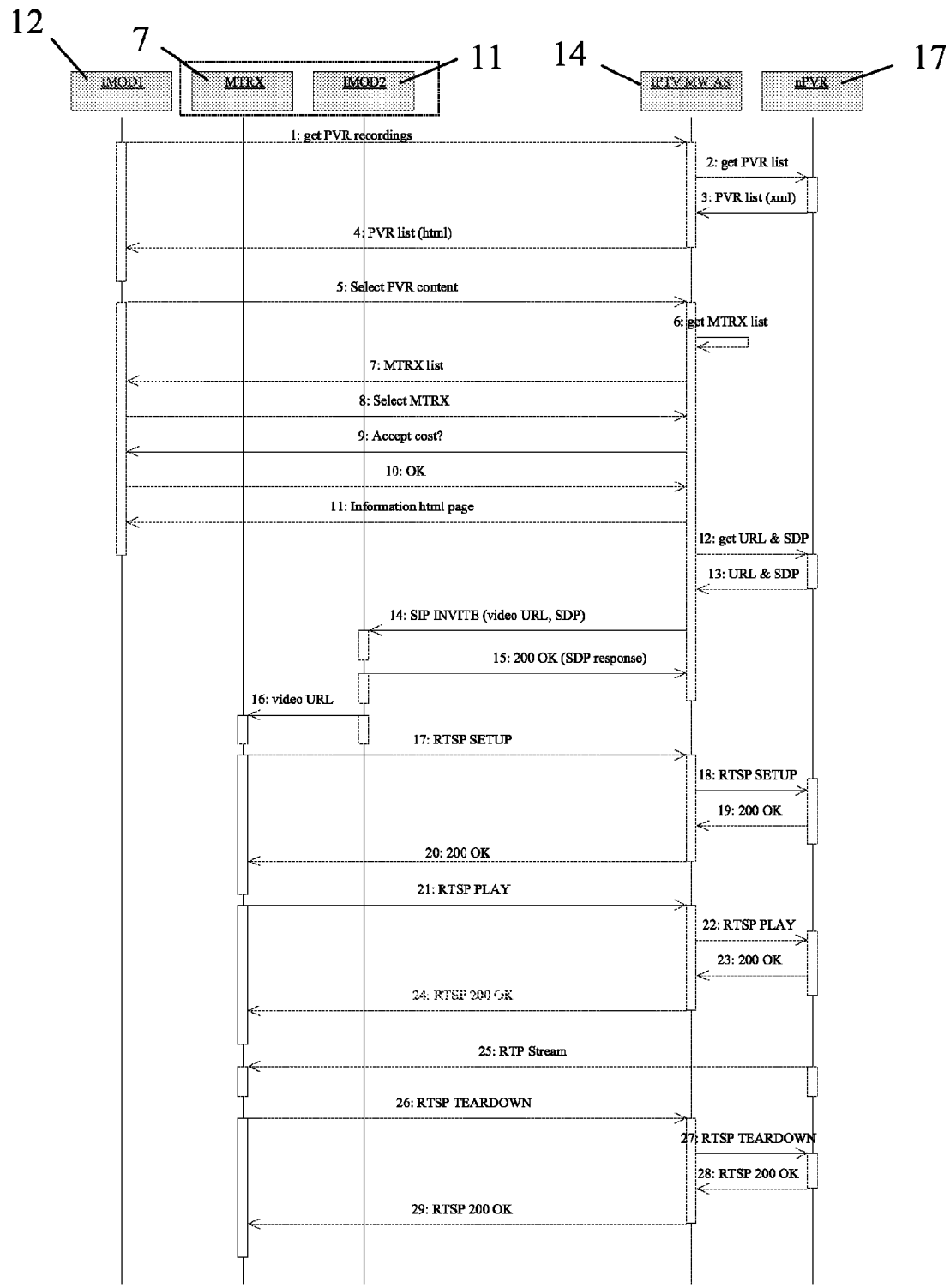
FIG. 5 illustrates a process for remotely ordering delivery of a unicast media stream according to a second embodiment of the invention.

FIG. 5 illustrates an alternative approach to the delivering of media to a STB upon request by a MS and which takes advantage of SIP to negotiate media prior to providing the specific URL, based on what type of MTRX is requesting a video. This approach avoids the need for the RTSP DESCRIBE exchange (steps 16a to 16d of FIG. 4). Steps 1 to 11 are as described above with reference to FIG. 4. However, at steps 12 and 13 the IPTV MW AS retrieves from the nPVR details of the user selected video content. These details include the RTSP video URL as well as media properties of the video content in the form of SDP assuming that the nPVR supports the RTSP DESCRIBE method (otherwise the nPVR will provide the details in a list form and the IPTV MW AS will construct an appropriate SDP). If the video content is available in multiple coding formats or if the nPVR is capable of delivering the video content in multiple coding formats through transcoding, that information is also provided, including multiple video URL's if necessary. One way to retrieve the media properties for every video URL is to use RTSP DESCRIBE method, i.e. the nPVR delivers multiple URLs to the IPTV MW AS and the AS returns multiple DESCRIBE messages. Alternatively the information is delivered in a suitable list [video URL1: media parameters, video URL2: media parameters, . . . ] using for example HTTP.

At step 14, the IPTV MW AS sends a SIP INVITE to the IMOD2 including the video URL and the proposed SDP, including any coding variations available for the specific content. IMOD2 responds at step 15 with a 200 OK containing its preferred media properties based on capabilities of the MTRX matched to the options in the SDP received in step 15. Step 14/15 may need to be iterated, specifically with any new video URL based on the requested media properties. [It is of course assumed that the IMOD2 knows the capabilities of the MTRX in order to be able to negotiate media properties on its behalf.]

At step 16, only the (negotiated) video URL is provided to the MTRX. No media description needs to be provided as the URL has already been selected based on the properties of the MTRX. Again, the UPnP AV Transport protocol may be used at step 16. The standard RTSP SETUP procedure is carried out in order to exchange media IP address and port information between the client and the server. This is as described above with reference to FIG. 5. The subsequent media play and terminate processes have also been described.

It will be appreciated by the person of skill in the art that various modifications may be made to the above described embodiments without departing from the scope of the present invention.

The invention claimed is:

1. An application server for use in an IP Multimedia Subsystem to control the delivery of unicast media to client terminals, the application server comprising:
  a receiver for receiving a request from a first client terminal to deliver unicast media from the IP Multimedia Subsystem to a second client terminal;
  a processor and transmitter for sending a Session Initiation Protocol INVITE message to said second client terminal, the INVITE message including a media Universal Resource Locator identifying a media source; and
  means for negotiating the identity of said second client terminal with said first client terminal, said comprising a transmitter for sending to the first terminal a list of allowed second client terminals, and the receiver for receiving from the first client terminal a selection from the list.

2. An application server according to claim 1 and comprising means for terminating a secure control channel established with said second client terminal.

3. An application server according to claim 2 and comprising further means for using said control channel to provide source and destination address information for delivering said unicast media, to said second client terminal and to a unicast media source.

4. An application server according to claim 3, said further means using the Real Time Streaming Protocol (RTSP).

5. An application server according to claim 4, said further means being arranged to receive from said second client terminal an RTSP DESCRIBE message addressed to said media URL, and to deliver this message to the media source.

6. An application server according to claim 4, said processor and transmitter being arranged to include in said Session Initiation Protocol INVITE a Session Description Protocol part containing for the media stream.

7. An application server according to claim 6, said Session Description Protocol part containing the media properties.

8. An application server according to claim 6 and comprising means for receiving from the second client terminal destination addressing information for the media stream contained in a Session Description Protocol part of a 200 OK response.

9. A method of ordering the delivery of a unicast media stream to a second client terminal coupled to an IP Multimedia Subsystem network, the method comprising:
  sending a unicast media order from a first client terminal to an application server of said IP Multimedia Subsystem network, wherein the unicast media order requests delivery of the unicast media stream from the application server to the second client terminal;
  sending a Session Initiation Protocol INVITE message from said application server to said second client in response to receipt of said order, the INVITE message containing a media Universal Resource Locator identifying a media source;
  using said Universal Resource Locator to exchange Real Time Streaming Protocol signalling between said second client terminal and the application server to initiate and control delivery of the media; and
  wherein the application server and the first client terminal carry out an initial negotiation procedure to identify to the application server the second client terminal, wherein the application server sends to the first client terminal a list of candidate second terminals, and the first client terminal returns a selection to the application server.

10. A method according to claim 9, wherein receipt of the INVITE at said second terminal triggers an RTSP negotiation between the second terminal and a media source, via the application server, to establish source and destination addressing information for the media stream to be delivered.

11. A method according to claim 10, wherein said negotiation involves the sending of an RTSP DESCRIBE message from the second terminal to the application server at said Universal Resource Locator.

12. A method according to claim 11, wherein the RTSP DESCRIBE message is delivered by the application server to the media source, and the media source returns a 200 OK response to the second client terminal via the application server.

13. A method according to claim 10, wherein the RTSP messages are sent over a secure IP control channel established between the second client terminal and the application server.

14. A method according to claim 9, wherein said INVITE contains a plurality of Universal Resource Locators, corresponding to different media properties.

15. A method according to claim 14 and comprising conducting a separate DESCRIBE and 200 OK exchange for each URL, with the second client terminal selecting the appropriate Universal Resource Locator based upon its own properties.

16. A method according to claim 9, wherein the application server includes in said INVITE a Session Description Protocol part identifying the source addressing information for the media to be delivered.

17. A method according to claim 16, the Session Description Part containing media properties.

18. A method according to claim 16, wherein the second client terminal returns destination addressing information in a Session Description Protocol part in the 200 OK response.

19. A method according to claim 18, wherein the Session Description Protocol part of the INVITE includes properties of one or more media streams.

20. A method according to claim 9, wherein the application server and the first client terminal carry out an initial negotiation procedure to identify to the application server the second client terminal.

21. A method according to claim 20, wherein the application server sends to the first client terminal a list of candidate second terminals, and the first client terminal returns a selection to the application server.

22. A user terminal arranged in use to communicate with an application server of an IP Multimedia Subsystem, the user terminal comprising:
- a transmitter for sending to said application server a request for delivery of unicast media from the application server to a remote terminal;
- a receiver for receiving from said application server a list of remote terminals authorized to receive unicast media from the application server; and
- a processor and transmitter for receiving a user selection from said list and for sending the selection to the application server, prompting the application server to send a Session Initiation Protocol INVITE message to said remote terminal, the INVITE message including a media Universal Resource Locator identifying a media source.

23. A user terminal according to claim 22 and comprising an HTTP interface for communicating with the application server.

\* \* \* \* \*